Aug. 21, 1923.
A. E. PETERS
1,465,719
CHAIN WELDING MACHINE
Filed Oct. 18, 1919
2 Sheets-Sheet 1
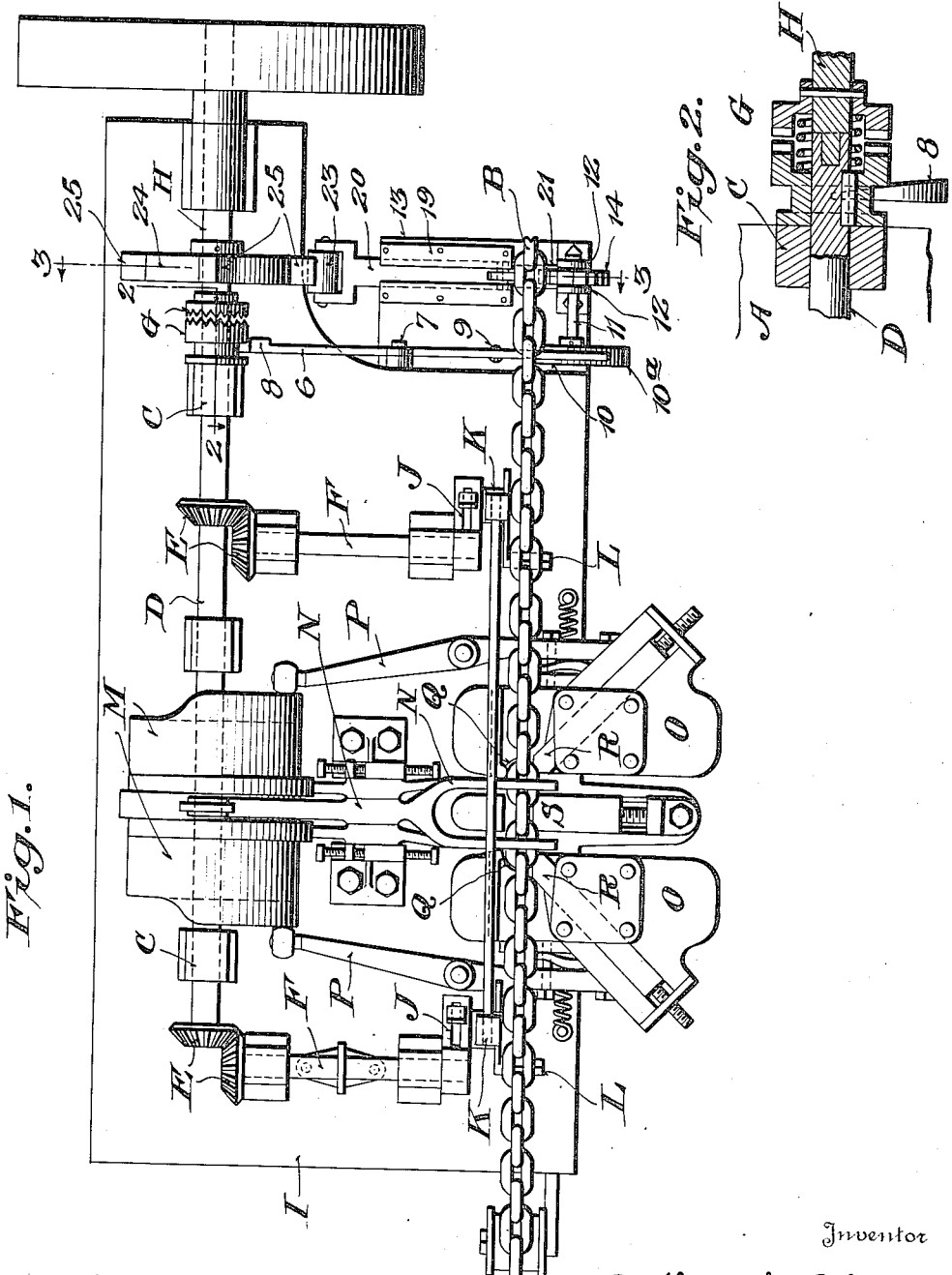

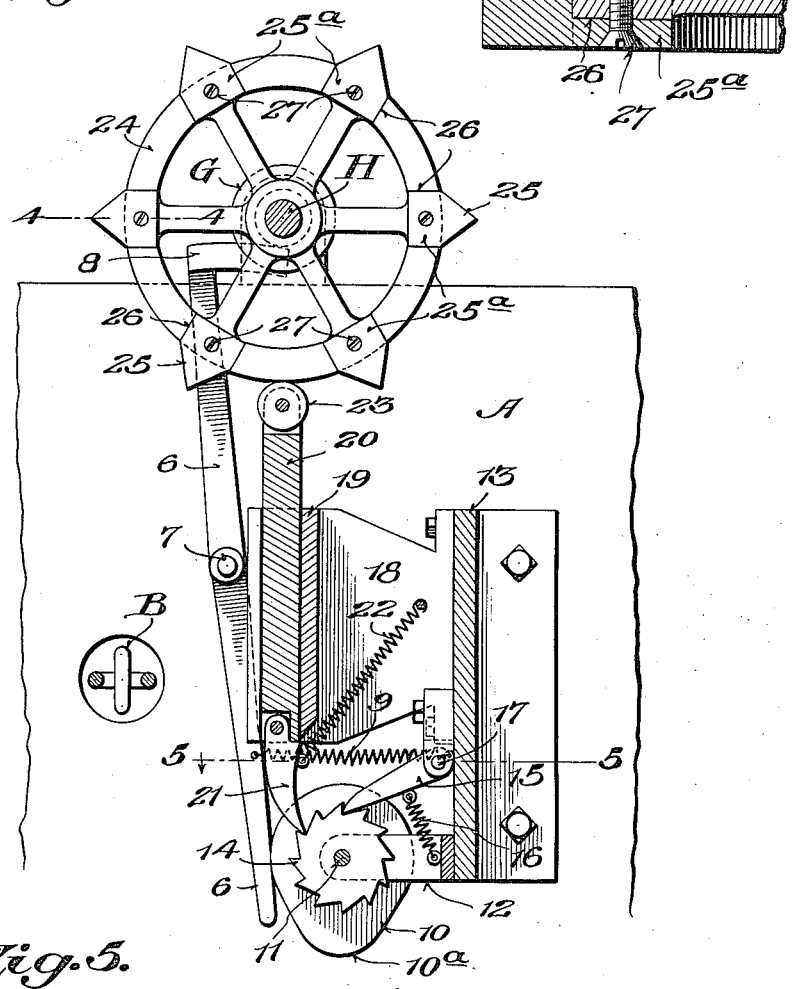

Patented Aug. 21, 1923.

1,465,719

UNITED STATES PATENT OFFICE.

ARTHUR E. PETERS, OF NEAR YORK, PENNSYLVANIA.

CHAIN-WELDING MACHINE.

Application filed October 18, 1919. Serial No. 331,617.

*To all whom it may concern:*

Be it known that I, ARTHUR E. PETERS, a citizen of the United States, residing near York, in the county of York and State of Pennsylvania, have invented certain new and useful Improvements in Chain-Welding Machines, of which the following is a specification, reference being had therein to the accompanying drawing.

This invention relates to automatic means for controlling the movement through a chain-welding machine of a chain whose links are being welded at their joints.

It is an object of the invention to provide a mechanism for this purpose that will cause the chain to move intermittently through the machine after intervals of rest of the length required for the proper welding of the joints.

The mechanism provided by the invention is adapted to be associated with chain-welding machines of types now commonly in use, and it includes means whereby the length of the intervals between the progressive intermittent movement of the chain may be altered to meet varying demands of service.

When read in connection with the description herein, the characteristics of the invention will be apparent from the accompanying drawings, forming part hereof, wherein an embodiment of the invention is disclosed, for purposes of illustration.

While the disclosures herein are considered to exemplify what now is considered a preferable embodiment of the invention, it is to be understood that it is not the intention to be limited necessarily thereto in interpretation of the claims, as modifications and adaptations within the limits of the claims can be made without departing from the nature and spirit of the invention.

Like reference-characters refer to corresponding parts in the views of the drawings, of which—

Figure 1 is a side elevation;

Fig. 2 is an enlarged sectional view of the clutch;

Fig. 3 is an end elevation, partly in section on the line 3—3, Fig. 1;

Fig. 4 is an enlarged fragmentary sectional view of the drive-shaft wheel on the line 4—4, Fig. 3; and Fig. 5 is a sectional view on the line 5—5, Fig. 3.

Having more particular reference to the drawings, A designates an electric or other chain-welding machine that includes means for moving a chain progressively therethrough and for welding its joints, a chain B being shown as moving in unwelded condition into the left side of the machine and out of the machine at the right side after being welded. Machines that so act being common in the art, and the details of the mechanism thereof not pertaining directly to the present invention, a machine of this sort is exemplified merely to the extent necessary to exemplify a typical organization of such a machine. Journals C carry a main shaft D, which actuates the operative parts of the machine through the instrumentality of any suitable parts, such as, for example, gears E and shafts F, and the main shaft is rotated by a clutch G and a continuously-rotating drive-shaft H.

The welding-machine shown by Fig. 1 includes a table I, chain-feed levers J connected with the shafts F, and arms K mounted on the levers in such manner that a projecting-pin L thereon may be brought into proper position to contact periodically with links between the ends of links connected with them to advance the chain through the machine. Mounted on the shaft D is a cam M arranged to operate oppositely-disposed swaging-hammers, of which one is shown by the drawing and designated by N, and also to operate welding-jaws O through the instrumentality of levers P. The jaws have seats Q against which rest links to be welded. They also have electrodes R, which also act as compressing members for links to force ends thereof together when being welded, and a central electrode S constituting a jaw. During sliding movement of the jaws O, current passes through one of the electrodes R, through the link being welded, thence through the central electrode or jaw S into another link on the other jaw O and through it to the other electrode.

In machines of this sort, the mechanism that moves the chain is actuated periodically, after welding of a link or links is completed, to bring the next succeeding link or links into position to be acted on by the electric or other welding means employed. In some chain-welding machines now in use such movement of the chain is produced by the operator, as by swinging a lever and throwing a clutch and thus the length of the welding periods is left to the judgment of the operator, and the machine requires his constant attention.

The mechanism provided by this invention is so arranged and so associated with such a machine that the chain will be moved automatically and progressively through the machine, the movements occurring after links have been in welding positions uniform periods and irrespective of the attention of an operator and without its being necessary for him to operate any parts.

This mechanism includes a lever 6, which may have been used for manually throwing a clutch or the like to cause the chain to progress. In the embodiment shown, the lever is fulcrumed intermediately of its ends, as on a pivot 7 on the machine; at one end it has a cam member 8 arranged to cause a spring-controlled member of the clutch to engage the other member and thus cause rotation of the main shaft D and actuation of the chain-moving mechanism; and a spring 9 normally maintains the lever in a position to permit the spring-controlled clutch member to remain out of clutching position.

The spring 9 also maintains the lever on the side opposite to the clutch-operating end against a cam 10, which is substantially circular in the major portion of its periphery and which has an eccentric portion 10$^a$ arranged to swing the lever and thus throw the clutch members into engagement and cause actuation of the chain-advancing mechanism of the machine.

The cam is fast on a shaft 11 journaled in bearings 12 on a bracket 13 attached to the machine. A ratchet-wheel 14 also is fast on shaft 11, and its retrograde movement is prevented by a pawl 15 kept in contact with the wheel by a spring 16. The pawl is journaled on a shaft 17 in the base of a standard 18. The standard has a guideway 19 in which a member 20 is reciprocable.

A pawl 21 is pivotally mounted on one end of the member 20 and it is kept in engagement with the ratchet-wheel 14 by a coil-spring 22 secured thereto at one end and extending at an inclination to the line of movement of the member to its other end where it is connected to the standard.

A roller 23 is mounted on the other end of the member 20, and the spring 22 operates, not only to maintain the pawl 21 against the ratchet-wheel 14, but also the roller in contact with the periphery of a wheel 24 mounted on the continuously-rotating drive-shaft H.

The wheel 24 has on its rim a series of projections or teeth 25, the outer ends of which are pointed or otherwise formed to afford bearing-surfaces for the roller 23 that are inclined with respect to the periphery of the wheel.

During the continuous rotation of the wheel 24, its projections impart movement in one direction to the member 20, and that member, through the instrumentality of its pawl 21, intermittently rotates the ratchet-wheel 14 and thereby the shaft 11 and the cam 10. Movement in the opposite direction is imparted to the member, and its roller 23 maintained against the periphery of the wheel 24, by the spring 22.

At proper intervals the eccentric portion of the cam 10 will move around against and swing the lever, whereby the clutch is operated and the main shaft D and the chain-advancing mechanism actuated. The parts will be retained in these operating positions by the cam-eccentric for the time required to move welded links from and unwelded links into welding position, and then operation will be discontinued as the cam-eccentric passes from the lever and the parts returned to normal or inactive positions as a result of action of the lever and clutch springs.

The member of projections on the wheel 24 ordinarily is such as to give sufficient reciprocatory movement to the member 20 to impart one complete rotation to the cam and thus swing the lever at the end of the periods required to weld links under normal conditions and with the drive-shaft H running at normal speed. In order to alter this period to meet changed conditions, the projections 25 are detachable from the wheel 24, so that their number may be decreased to decrease the frequency of reciprocation of the member 20 and thus increase the length of the periods between which the eccentric portion of the cam operates to swing the lever and move the chain, or their number increased to increase the frequency of lever operation and chain movement.

In order that the projections may be placed on and removed from the wheel, the wheel-rim is formed at intervals with mortises 26, and the projections are formed with tenons 25$^a$ arranged to seat in these mortises and to be held therein by screws 27.

Having thus described my invention, what I claim as new, and desire to secure by Letters Patent, is—

1. In a chain-welding machine having a main shaft, a clutch, and a drive-shaft arranged to drive the main shaft through the clutch, the combination of a lever arranged to operate said clutch, a shaft, a cam fast on said shaft, a spring holding said lever in contact with said cam, a ratchet-wheel fast on said shaft, a guideway, a member reciprocable in said guideway, a pawl on said reciprocable member in engagement with said ratchet-wheel, and a rotatable member on said drive-shaft arranged to operate said reciprocable member.

2. In a chain-welding machine having a main shaft, a clutch, and a drive-shaft arranged to drive the main shaft through the clutch, the combination of a member arranged to operate said clutch, a cam positioned to operate said member, a ratchet-and-pawl mechanism arranged to rotate said cam and including a reciprocable operating member, a wheel on said drive-shaft having a rim formed at intervals with mortises, and projections on said wheel arranged to operate said reciprocable member, said projections having tenons seated in said mortises.

In testimony whereof I affix my signature.

ARTHUR E. PETERS.